United States Patent [19]
Fried et al.

[11] Patent Number: 5,930,721
[45] Date of Patent: Jul. 27, 1999

[54] EMULATING AN ADVANCED CONTROL ALGORITHM IN A MOBILE COMMUNICATIONS SYSTEM

[75] Inventors: Tomas Fried, Bromma; Erik Westerberg, Hägersten; Sten Hermansson, Sköndal, all of Sweden

[73] Assignee: Telefonaktiebolaget L M Ericsson, Stockholm, Sweden

[21] Appl. No.: 08/801,564

[22] Filed: Feb. 18, 1997

[51] Int. Cl.$^6$ ........................................... H04Q 7/20
[52] U.S. Cl. ................................. 455/466; 455/437
[58] Field of Search .................... 455/422, 433, 455/435, 436, 437, 450, 451, 456, 464, 466, 515, 552, 553, 560, 561; 370/349, 332, 328, 331, 352, 353, 354, 465, 466

[56] References Cited

U.S. PATENT DOCUMENTS

| | | | |
|---|---|---|---|
| 5,530,693 | 6/1996 | Averbuch et al. | 370/331 |
| 5,663,990 | 9/1997 | Bolgiano et al. | 375/347 |
| 5,701,297 | 12/1997 | Csapo et al. | 370/331 |
| 5,711,008 | 1/1998 | Gallant et al. | 455/466 |
| 5,721,762 | 2/1998 | Sood | 455/466 |
| 5,729,542 | 3/1998 | Dupont | 455/512 |
| 5,729,544 | 3/1998 | Lev et al. | 370/352 |
| 5,752,193 | 5/1998 | Scholefield et al. | 455/452 |
| 5,777,991 | 7/1998 | Adachi et al. | 370/352 |
| 5,790,534 | 8/1998 | Kokko et al. | 370/352 |
| 5,794,157 | 8/1998 | Haartsen | 455/522 |
| 5,797,099 | 8/1998 | Ejzak et al. | 455/422 |
| 5,805,982 | 9/1998 | Hulsebosch | 455/466 |

OTHER PUBLICATIONS

6th IEEE International Symposium on Personal, Indoor and Mobile Radio Communications, vol. 1, Toronto, Canada, Sep. 27, 1995; Proposed Operation of GSM Packet Radio Networks; J. Hä mä läinen et al.; XP000645965.

International Conference on Universal Personal Communications; Tokyo Japan; Nov. 6, 1995; GPRS, General Packet Radio Service; S. Akesson; XP000645966.

Globecom '95, IEEE Global Telecommunications Conference, Singapore, Japan; Nov. 14–16, 1995; Packet Data Service Over GSM Networks With Dynamic Stealing of Voice Channels; XP000622970.

*Primary Examiner*—Dwayne D. Bost
*Assistant Examiner*—Jean A. Gelin
*Attorney, Agent, or Firm*—Jenkens & Gilchrist, P.C.

[57] ABSTRACT

A telecommunications system and method is disclosed, whereby a packet switched system emulates the location algorithm of a circuit switched system. The packet switched system, wherein cell reselection is performed primarily by the mobile stations, has advanced locating and flexible cell reselection capabilities that cause the packet switched traffic to behave (from a control standpoint) virtually the same, with respect to cell reselection and locating, as the circuit switched traffic. In other words, the packet switched mobile terminals are able to emulate the locating functions of the circuit switched system, which minimizes signal interference between the two systems.

23 Claims, 4 Drawing Sheets

EMULATING AN ADVANCED CONTROL ALGORITHM IN A MOBILE COMMUNICATIONS SYSTEM

BACKGROUND OF THE INVENTION

1. Technical Field of the Invention

The present invention relates in general to the mobile telecommunications field and, in particular, to a method and apparatus for a packet switched system to emulate a locating algorithm of a circuit switched system in a cellular communications system, or vice versa.

2. Description of Related Art

Generally, the use of packet switching in mobile communications systems will provide operators with a versatile platform for a large variety of data applications. In fact, communications system developers anticipate that packet switched communications will form a significant part of the future's mobile telephony traffic. Consequently, it is important to ensure that future packet switched systems will be capable of operating effectively in a wide range of communications environments. It is also important to ensure that future packet switched systems will be developed with a high degree of network design flexibility.

In all existing circuit switched mobile systems, control over cell reselection in the idle mode is exercised by a relatively simple software algorithm executed in a processor located in the mobile station. However, in most of these systems, control over cell reselection in the active mode (locating) is exercised by a more advanced, highly flexible software algorithm executed by a processor located in the fixed network. In contrast, for all packet switched mobile systems, control over cell reselection in the idle, standby and active modes is exercised by a relatively simple software algorithm in the mobile station.

Cell planning for circuit switched mobile systems has to be conducted with respect to the active mode cell selection algorithm (locating), since it is the task of the locating algorithm with its controlling parameters to realize the intentions of the cell plan. In other words, the active mode traffic creates the radio network environment in terms of geographical signal strength and interference distribution.

On the other hand, cell planning for a packet switched mobile system has to be conducted with respect to either the idle mode or standby mode cell reselection algorithm. Since packet traffic is very "bursty" (i.e., the majority of packet switched data transfers occur during relatively short periods of time), there is generally too little time available (translating to excessive signalling) to make it worthwhile to change cells by the locating process, when changing from the idle mode to the active mode. Therefore, the active transmissions occur in the cell that has been selected by the idle/standby cell reselection algorithm.

These two different methods used for performing radio network control can lead to different results for various cell selection evaluations made. These different results, in turn, give rise to different radio network environment characteristics for the two types of systems, such as, for example, different handover borders, or different geographical distributions for average signal interference.

If a packet switched system and a circuit switched system share a frequency band in the same geographical area, each system's mobile station population (or type of traffic) can contribute to increased radio signal interference with the other system's mobile station population (or type of traffic). This interference originates in those areas where the handover borders differ. Consequently, a circuit switched mobile system operating with a "tight" frequency plan may not be able to accommodate packet data channels on the same carrier frequencies unless the "tight" frequency plan is relaxed.

In such a multi-service environment, the packet switched system is typically an add-on to an existing circuit switched system having a relatively large subscriber base. Consequently, the amount of packet switched traffic being carried is relatively small compared to the circuit switched traffic. Therefore, it follows that a higher percentage of packet switched traffic than circuit switched traffic will be susceptible to signal interference. This interference occurs primarily because the cell borders for the packet switched traffic and the cell borders for the circuit switched traffic differ from each other due to the differences in the cell selection algorithms for the two types of traffic.

In existing cellular communications systems, advanced locating control is exercised either by a network entity (or entities), or simple cell reselection is used by the mobile stations. For example, in the Nordic Mobile Telephone (NMT) System, Total Access Communications System (TACS), Advanced Mobile Phone System (AMPS), Digital Advanced Mobile Phone System (D-AMPS), Global System for Mobile Communications (GSM), Personal Digital Cellular (PDC) System, and IS-95 Code Division Multiple Access (CDMA) System, one or more network entities exercise advanced locating control in the active mode, while the mobile stations perform simple cell reselection in the idle mode. In the Digital European Cordless Telephone (DECT) and IS-661 circuit switched systems, the mobile stations perform simple cell reselection in both the active and idle modes. Furthermore, in the Cellular Digital Packet Data (CDPD) and Mobitex packet switched systems, the mobile stations perform simple cell reselection in the active, standby and idle modes. In other words, as demonstrated by the differences described above, there is no existing cellular communications system that utilizes a cell reselection algorithm that emulates any other cell reselection or locating algorithm.

SUMMARY OF THE INVENTION

A problem encountered in prior art mobile communications systems is that advanced cell locating is exercised by an algorithm at the network side, while simple cell reselection is exercised by the mobile stations. Consequently, when a packet switched service is added to a circuit switched system, the packet switched system and circuit switched system behave inconsistently, from a radio network control standpoint. This inconsistent behavior increases the signal interference between the two systems, and thereby degrades the capacity of the circuit switched system and signal quality of both systems.

It is, therefore, an object of the present invention to provide a packet switched system with advanced and flexible cell reselection mechanisms that enable the packet switched traffic to behave in an equal manner, with respect to cell reselection and locating, as the speech or data connections in the circuit switched system.

It is also an object of the present invention to maximize the capacity and signal quality for all traffic in a mobile communications system that provides diverse bearer services.

It is yet another object of the present invention to minimize radio signal interference between packet switched and circuit switched traffic in a cellular communications system.

In accordance with the preferred embodiment of the present invention, the foregoing and other objects are provided by a method and apparatus for a packet switched system to emulate the location algorithm of a circuit switched system. The packet switched system, whereby cell reselection is performed primarily by the mobile stations, has advanced locating and flexible cell reselection capabilities that cause the packet switched traffic to behave (from a control standpoint) virtually the same, with respect to cell reselection and locating, as the circuit switched traffic. The advanced cell reselection can be performed in the standby mode as well as the ready/active mode. In other words, the packet switched system is able to emulate the locating functions of the circuit switched system.

In a broader aspect of the present invention, a method and apparatus are provided for a first type of mobile communications system (e.g., circuit switched or packet switched system), which utilizes a relatively primitive radio network control algorithm, to emulate the more advanced radio network control algorithm of a second type of mobile communications system (e.g., packet switched or circuit switched system, respectively), and thereby enables the two systems' traffic to behave virtually the same way in the same radio network environment. For example, the cell borders and/or signal power distribution for the two systems can be configured to coincide, which minimizes radio signal interference between the two systems and maximizes their capacity and signal quality.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–6 of the drawings, like numerals being used for like and corresponding parts of the various drawings.

Figure 1:
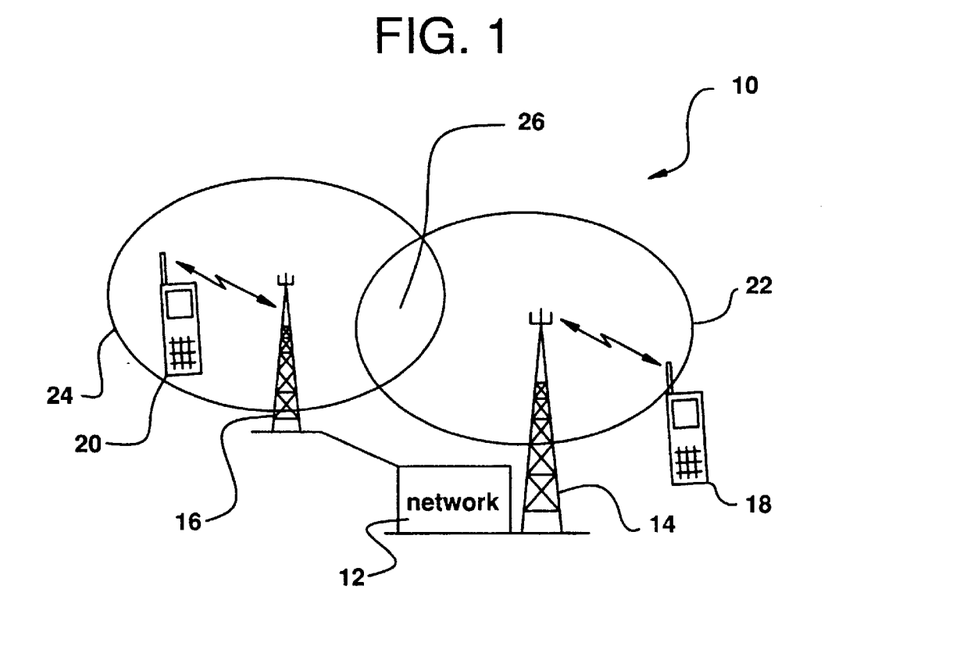
FIG. 1 is a simplified schematic drawing of a cellular communications system that carries both circuit switched traffic and packet switched traffic, in accordance with a preferred embodiment of the present invention.

FIG. 1 is a simplified schematic drawing of a cellular communications system that carries both circuit switched traffic and packet switched traffic, in accordance with a preferred embodiment of the present invention. For example, the General Packet Radio Service (GPRS) is a new packet data service that has been specified for use with the circuit switched, digital GSM. For a comprehensive overview of the GSM, refer to "The GSM System for Mobile Communications" by M. Mouly and M. B. Pautet, Cell & Sys., Copyright 1992 (ISBN: 2-9507190-0-7). The current GPRS standard is described in the GSM Technical Specification, GSM 04.60, Version 0.9.1, Sep. 26, 1996©. Notably, although the exemplary embodiment illustrated by FIG. 1 centers on a system that can carry both packet data traffic and circuit switched traffic (e.g., GPRS and GSM), the scope of the present invention is not intended to be so limited. For example, the inventive concept can be applied to any mobile communications system wherein radio network control functions such as, for example, locating and cell reselection are maintained and exercised by one or more network entities or by one or more populations of mobile stations.

For the exemplary embodiment illustrated by FIG. 1, system 10 includes a Public Land Mobile Network (PLMN) 12. Network 12 can include a first base station/transceiver unit 14 for, in this example, sending and receiving circuit switched traffic (e.g., GSM), and a second base station/transceiver unit 16 for, in this example, sending and receiving packet switched traffic (e.g., GPRS). For the purpose of clarity, only the base station/transceiver units 14 and 16 are shown, but it should be understood that network 12 can also include other mobile network components, such as, for example, one or more mobile services switching centers (MSCs), home location registers (HLRs), or visitor location registers (VLRs).

In this embodiment, a mobile terminal (e.g., cellular phone) 18 is coupled via an air interface to base station/transceiver unit 14. Mobile terminal 18 thereby functions to send and receive circuit switched traffic. Mobile terminal 18 can represent one or more of a plurality of circuit switched mobile terminals. A second mobile terminal 20 is coupled via an air interface to base station/transceiver unit 16. Mobile terminal 20 thereby functions to send and receive packet switched traffic. Mobile terminal 20 can represent one or more of a plurality of mobile terminals capable of handling packet switched traffic. In this example, the transmissions from base station/transceiver unit 14 define a circuit switched coverage area (e.g., cell) 22, and the transmissions from base station/transceiver unit 16 define a packet switched coverage area (or cell) 24.

As shown in FIG. 1, the circuit switched coverage area 22 overlaps the packet switched coverage area 24 at region 26. Notably, the circuit switched and packet switched traffic can share the same radio network carrier frequency bands. Consequently, mobile terminals 18 or 20 moving into or near coverage area 26 can be operating on the same set of radio network carrier frequencies, while sending and receiving their respective circuit switched or packet switched traffic.

Essentially, in accordance with the present invention, the packet switched system, where cell reselection is performed primarily by the mobile stations, has advanced locating and flexible cell reselection capabilities that cause the packet switched traffic to behave (from a control standpoint) virtually the same, with respect to cell reselection and locating, as the circuit switched traffic. The advanced cell reselection can be performed in the standby mode (packet switched mobile station operating in standby mode), as well as the ready/active mode (packet switched mobile station actively transmitting packets). In other words, the packet switched system is capable of emulating the locating functions of the circuit switched system. Therefore, in accordance with the present invention, an operator can develop a cell plan that utilizes these advanced features and still ensure that the packet switched traffic and circuit switched traffic behave virtually the same way (from a control standpoint) in the radio network environment. Consequently, signal interference between the packet switched and circuit switched mobile terminals can be minimized, and the communications capacity and quality of service for both types of traffic can be maximized.

Notably, although the preferred embodiment is described herein with respect to the combination of a packet switched system and a circuit switched system, the inventive concept is not intended to be so limited. The present invention can also apply to any packet switched, circuit switched, or other type of mobile communications system that utilizes a mobile-initiated handoff scheme or other type of radio network control scheme exercised by the mobile stations. More broadly, the invention enables a first type of mobile communications system, which utilizes a relatively primitive radio network control algorithm, to emulate the more advanced radio network control algorithm of a second type of mobile communications system, so the two systems' traffic behaves virtually the same way (from a control standpoint) in the same radio network environment.

Specifically, returning to the illustrative embodiment in FIG. 1, the packet switched mobile stations (20) are responsible for cell selection and reselection for their packet transmissions. The network (12) broadcasts a control message (or series of messages), in accordance with a standard network-to-mobile control message protocol, to the packet switched mobile stations (20) via the packet switched base station/transceiver unit (16). The control message includes the same information utilized by the locating algorithms in the circuit switched system (14, 18). the algorithms executed in the packet switched mobile stations (20) are capable of generating and utilizing all of the metrics (measurements) normally utilized by the locating algorithms in the circuit switched mobile system, whenever the packet switched mobile terminals (20) assess the candidacy of neighboring cells for the cell reselection process. As such, the present invention allows the cell reselection algorithms in the packet switched mobile stations to emulate the locating algorithms used in the circuit switched system.

For example, the network 12 can broadcast a control message over a general broadcast channel (e.g., Packet Broadcast Control Channel or PBCCH in the GPRS), which provides to all mobile terminals 20 capable of handling packet switched traffic, certain radio link control information to use for their ensuing cell reselection operations. Additionally, the control information can be sent to the packet switched mobile terminals in dedicated signalling messages or in packet transmissions (e.g., via a Packet Data Traffic channel or PDTCH in the GPRS). This information provided to the packet switched mobile terminals includes at least some or all of the same information being used by the locating algorithms in the network's circuit switched system. The control information that is sent to the packet switched mobile terminals can include, for example, the following: (1) cell reselection hysteresis (or multiple hystereses) parameters (a common value for all neighboring cells or individual values for each neighbor); (2) cell reselection offset parameters (a common value for all neighboring cells or individual values for each neighbor); (3) threshold parameters for selecting hysteresis (a common value for all neighboring cells or individual values for each neighbor); (4) neighboring cell priorities (e.g., hierarchical layer designations); (5) threshold parameters for layer changes (a common value for neighboring cells or individual values for each neighbor); (6) penalty offset parameters for handling fast moving mobiles (a common value for neighboring cells or individual values for each neighbor); and (7) penalty times for handling fast moving mobiles (a common value for neighboring cells or individual values for each neighbor). Exemplary measurements that the cell reselection algorithms in the packet switched mobile terminals can thereby handle include: (1) signal strength; (2) path loss; (3) signal quality (e.g., bit error rate, frame erasure ratio); and (4) distance (e.g., timing advance, synchronization information).

An exemplary cell reselection algorithm that can be used to implement the present invention of emulating a circuit switched system's (e.g., GSM) locating algorithm in a packet switched system (e.g., GPRS) reselection algorithm has at least the following features: (1) cell-to-cell related offset parameters, which can be adapted to create the same cell borders as the base station/transceiver creates for the circuit switched system (e.g., GSM); (2) two different hystereses can be utilized in each cell (e.g., large for tight urban environments and small for suburban and rural environments), as is generally accomplished for circuit switched traffic; and (3) temporary offsets are used to prevent fast moving mobile terminals from selecting small cells (micro- or pico-cells). Specifically, the following parameters can be used with the packet switched cell reselection algorithm: (1) RESELECTION_PARAMETER_1 (Group 1), includes offset and hysteresis values for the serving cell and neighbor cells; (2) RESELECTION_PARAMETER_2 (Group 2), provides additional hysteresis values for the neighbor cells (e.g., if serving cell has high signal strength); and (3) RXLEV_TRH, which is the signal strength threshold for hysteresis selection (where rxlev is the running average of the signal strength). Additional parameters include: TEMPORARY_OFFSET (TO), which is used to avoid cell reselection into small cells for fast moving mobile terminals; PENALTY_TIME (PT), or the duration of the TEMPORARY_OFFSET; and H(T) and T (timer), which are defined in accordance with existing cell reselection criteria (e.g., GPRS C2 criteria).

Figure 2:
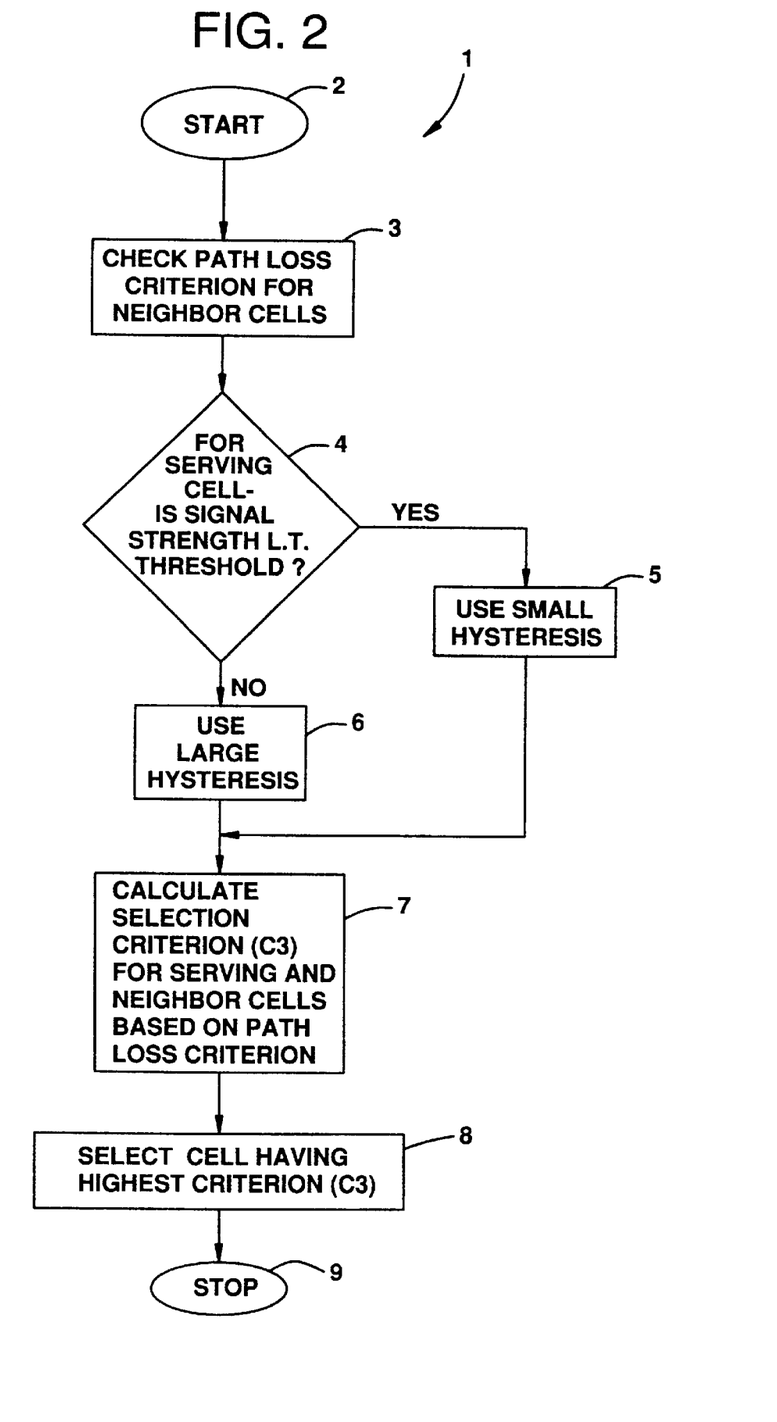
FIG. 2 is a simplified flow diagram of an exemplary packet switched system cell reselection algorithm, which can be used in a packet switched mobile terminal to emulate a circuit switched system locating algorithm, in accordance with the preferred embodiment of the present invention.

FIG. 2 is a simplified flow diagram of the exemplary packet switched system cell reselection algorithm (1), which can be used in a packet switched mobile terminal (e.g., mobile terminal 20 in FIG. 1) to emulate the circuit switched system locating algorithm, in accordance with the preferred embodiment of the present invention. At block 3, the cell reselection algorithm (1) first checks the path loss criterion (e.g., C1 in the GSM Specification 05.08) for the neighbor cells (e.g., according to the GPRS BCCH Allocation list). For the GPRS, for example, the C1 criterion is used as a minimum signal strength criterion. At block 4, for the serving cell, the signal strength is checked to determine whether it is less than a predetermined signal strength threshold level, in order to choose an appropriate hysteresis value. For example, for the GPRS: if rxlev(s)<RXLEV_TRH, then Group(n)=Group1(n), and a small hysteresis value is to be used (block 5). Otherwise, if rxlev(s)≧RXLEV_TRH, then Group(n)=Group1(n)+Group2(n), and a large hysteresis value is used (block 6). The letters "n" and "s" denote "neighbor cell" and "serving cell," respectively. At block 7, the algorithm calculates the cell selection criterion (e.g., C3 for the GPRS) for the serving cell and the neighbor cells, but meeting the path loss criterion. At this point, the appropriate offsets and hysteresis values are applied to the signal strength (rxlev). The cell selection criterion, C (or C3 for the GPRS), is calculated as follows:

C(s)=rxlev(s)-Group1(s), for the serving cell (s); and C(n)= rxlev(n)-group(n)-TO(n)*H(PT(n))-T), for the neighbor cell. At block 8, the packet switched mobile terminal algorithm selects the cell having the highest criterion (C).

For the GPRS, for example, the use of the cell reselection criterion, "C3," requires system information which is broadcast via the serving cell (preferably on the Master Packet Data Channel, or MPDCH) This additional information includes the following radio link control parameters: (1) BA-GPRS, or the Broadcast Control Channel Allocation for the neighbor cells supporting the GPRS; (2) BSIC or Base Station Identity Code; (3) GPRS_RESELECTION_PARAMETER_1(s and n), which is the cell reselection parameter for the serving and neighbor cells; (4) GPRS_RESELECTION_PARAMETER_2(n), which is the additional hysteresis parameter for the neighbor cells that is applied if the serving cell has a relatively high signal strength; (5) RXLEV_TRH, which is the signal strength threshold used for selecting Group1(n) or Group1(n)+Group2(n); (6) TEMPORARY_OFFSET(n), which is used to avoid cell reselection into small cells for fast moving mobile terminals; and (7) PENALTY_TIME(n), which is the duration of the TEMPORARY_OFFSET(n). In order to ensure that only the broadcast resources needed are used, as an option, all or only a portion of these radio link control parameters may be broadcast. For the case where some of these parameters are not broadcast from the system, the following assumptions may be made: (1) if Group1(n) has not been broadcast to the mobile terminal, then that parameter is set to Group1(s) (i.e., the parameter for that neighbor cell is the same as the serving cell); (2) if Group2(n) has not been broadcast to the mobile terminal, then that parameter is set to zero (i.e., that neighbor cell has only one hysteresis value); and (3) if none of these radio link control parameters have been broadcast to the mobile terminal, then the existing GPRS (C2) cell reselection criterion will be used.

Figure 3:
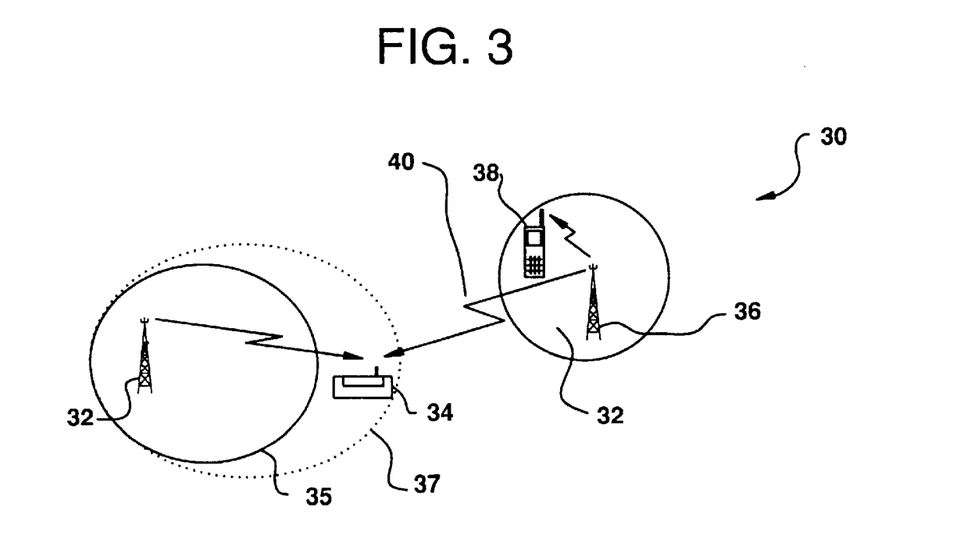
FIG. 3 is a simplified schematic drawing that illustrates an exemplary application for the present invention.

FIG. 3 is a simplified schematic drawing that illustrates an exemplary application for the present invention. Assume that a packet switched service is to be implemented with an existing circuit switched system (e.g., GPRS added to GSM), and by using careful network engineering and advanced locating functionality, the operator has tuned the circuit switched system to operate with a very high capacity. If the packet switched system has to operate with the same radio network frequencies as the circuit switched system, having the cell reselection algorithms in the packet switched mobile terminals emulate the locating algorithms in the circuit switched system ensures that radio interference between the two systems will be minimized. Otherwise, the signal quality and capacity of the circuit switched system would be degraded by the new packet switched traffic, and the quality of the packet switched service would be low. In order for an operator to be able to maintain the same carefully planned cell boundaries for the packet switched traffic as for the circuit switched traffic, the packet switched service will be required to obtain the same cell selection capability as the circuit switched locating algorithm (i.e., for the same network entity to be responsible for the cell reselection). However, in accordance with the present invention, this requirement can be avoided by having the cell reselection algorithm in the packet switched mobile stations emulate the circuit switched locating algorithm. Consequently, the two systems will be subject to exactly the same cell reselection/locating logic (or virtually the same, depending upon the differences in the measurement values involved).

As mentioned earlier, although the preferred embodiment described herein assumes that the packet switched system's cell reselection algorithm is relatively primitive in comparison with the circuit switched system's more advanced locating algorithm, the inventive concept is not intended to be so limited. The invention also covers the opposite situation, for example, where the packet switched system's cell reselection algorithm is more advanced than the circuit switched system's locating algorithm, and the circuit switched system's algorithm is then enabled to emulate the packet switched system's more advanced algorithm.

In other words, the present invention covers any situation where one mobile communications system utilizes a radio network control algorithm that is more advanced than a radio network control algorithm being utilized by a second mobile communications system in the same radio environment. The invention enables the less advanced radio network control algorithm of the one system to emulate the more advanced radio network control algorithm of the other system. Another illustrative example is where a relatively advanced mobile power control and base station power control algorithm are being executed in a network entity of a circuit switched system, and a less advanced mobile power control and base station power control algorithm is being executed in the mobile terminals of a packet switched system. Again, the invention enables the less advanced power control algorithm of the packet switched system to emulate the more advanced power control algorithm of the circuit switched system.

Returning to the illustrative example in FIG. 3, a mobile communications system 30 includes a base station/transceiver unit 32 that transmits and receives both circuit switched data and packet switched data. A mobile terminal 34 is configured to send and receive packet switched data to or from base station/transceiver unit 32. Terminal 34 can represent one or more of a plurality of packet switched mobile terminals. System 30 also includes a second base station/transceiver unit 36, which transmits and receives circuit switched data. A mobile terminal 38 is configured to transmit and receive circuit switched data to or from base station/transceiver unit 36. As shown, transceivers 32 and 36 are sharing radio network carrier frequencies. The dashed arrow denoted by the number "40" indicates co-channel interference that would have existed between the circuit switched system and packet switched system, but for the use of cell reselection algorithms in the packet switched mobile terminals (34) that emulate the circuit switched locating algorithm in accordance with the present invention. In other words, the co-channel interference (40) is minimized by having the circuit switched and packet switched systems use the same cell reselection/locating control logic (or at least virtually the same logic), thus causing the cell borders 35 and 37 to coincide at border 35 rather than being different as shown by the dotted line in FIG. 3.

Figure 4:
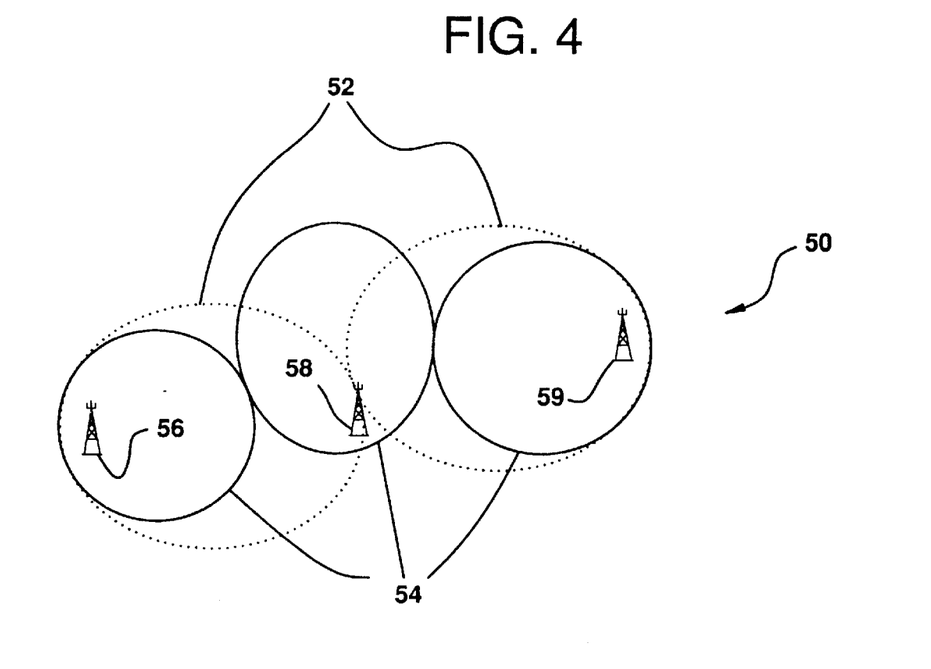
FIG. 4 is a simplified schematic drawing that illustrates a second exemplary application for the present invention.

FIG. 4 is a simplified schematic drawing that illustrates a second exemplary application for the present invention. Assume that a packet switched service is to be introduced to an existing circuit switched system (e.g., GPRS to be added to GSM), and introduction of the packet switched service is to be gradual. In other words, initially in system 50, some base stations will not provide the packet switched service. Consequently, for the prior systems, the cell boundaries for the circuit switched system and packet switched system 52 (without emulation) did not coincide, as shown in FIG. 4. For example, without emulation, if the two systems share the same frequency spectrum, the packet switched mobile terminals connected to cells 56 and 59 cannot be allowed to enter the coverage area of cell 58, for the reasons described above with respect to FIG. 3.

However, in accordance with the present invention, with a packet switched system with cell reselection that is capable of emulating the advanced locating functions of the circuit switched system, by using cell-to-cell relational offset information (e.g., broadcast from the network), the coverage areas of cells 56 and 59 in the packet switched system can be adjusted artificially (54) to approximate the cell borders of cells 56 and 59 in the circuit switched system. Although the area corresponding to the coverage area of cell 58 can lose the packet switched service (with emulation in the cell reselection algorithm), the operator's frequency plan can be maintained, and signal interference between the systems can be minimized.

Figure 5:
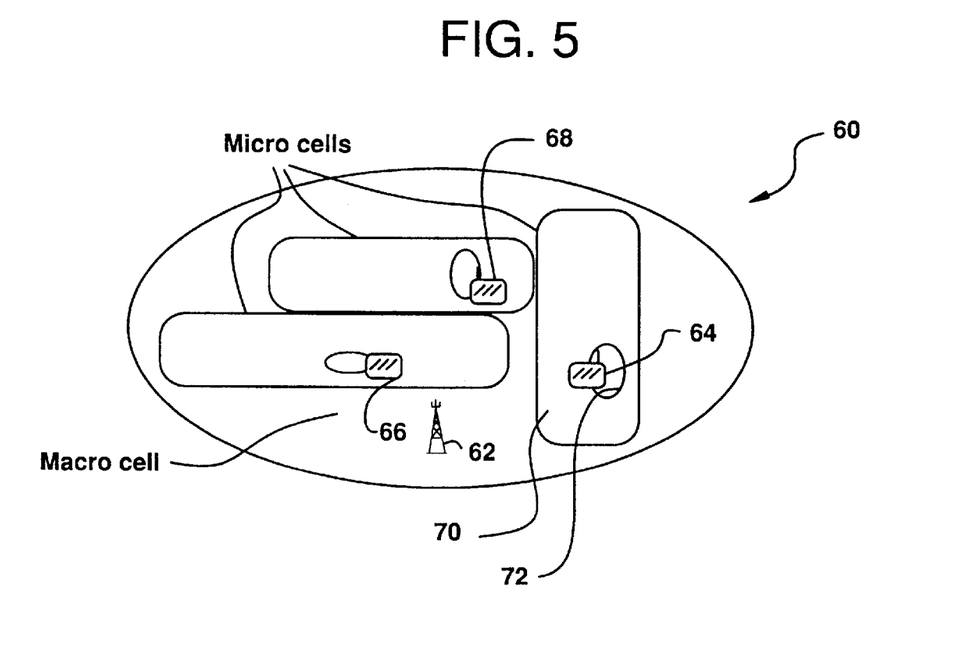
FIG. 5 is a simplified schematic drawing that illustrates a third exemplary application for the present invention.

FIG. 5 is a simplified schematic drawing that illustrates a third exemplary application for the present invention. In the near future, so-called "micro-cells" will be used for dispatch services, an important type of packet data service. In such a micro-cell environment, the desired cell boundaries cannot always be provided by the "best server" corresponding to the highest downlink signal strength received by a mobile station. The concept of "hierarchical functionality" has been used for handling cell selection in such layered cell structures. One approach that has been used is to attempt to connect mobiles to a cell in a "lower layer" of a hierarchy of layers, even if the "lower layer" cell is not defined by the "best server", thereby making use of the traffic capacity available in the "lower layer".

Assume that a circuit switched system and a packet switched system share carrier frequencies within the same geographical area. With hierarchical functionality, the packet switched system will be able to incorporate the same functionality for handling cell selection in layered cell structures, as the circuit switched system. Consequently, the cell boundaries for the packet switched traffic and circuit switched traffic will be aligned.

However, in a combined packet switched and circuit switched system with hierarchical functionality, but where the packet switched system has only a simple cell reselection capability, the cell boundaries for the packet switched and circuit switched systems will not be aligned. For example, referring now to FIG. 5, a mobile communications telephony system 60 includes a base station/transceiver unit 62 that transmits and receives energy in a pattern that defines a so-called "macro-cell". A second transceiver unit 64 transmits and receives energy that defines a micro-cell. A third and fourth transceiver unit 66 and 68, respectively, also transmit and receive energy that define micro-cells. Transceiver unit 64 carries packet switched and circuit switched traffic. Without emulation, the circuit switched traffic in the area between the cell boundaries defined by the two parts of the combined system (gray area in FIG. 4) would be connected to the micro-cell, but the packet switched traffic would be connected to the macro-cell (72). Consequently, the packet switched traffic would cause an undesirable load on the macro-cell, while resources of the micro-cells' base stations would go unused. On the other hand, in accordance with the present invention, by emulating the circuit switched locating algorithm in the cell reselection algorithms of the packet switched mobile terminals (not explicitly shown), the cell boundaries for the circuit switched and packet switched traffic will be calculated and aligned (70).

Figure 6:
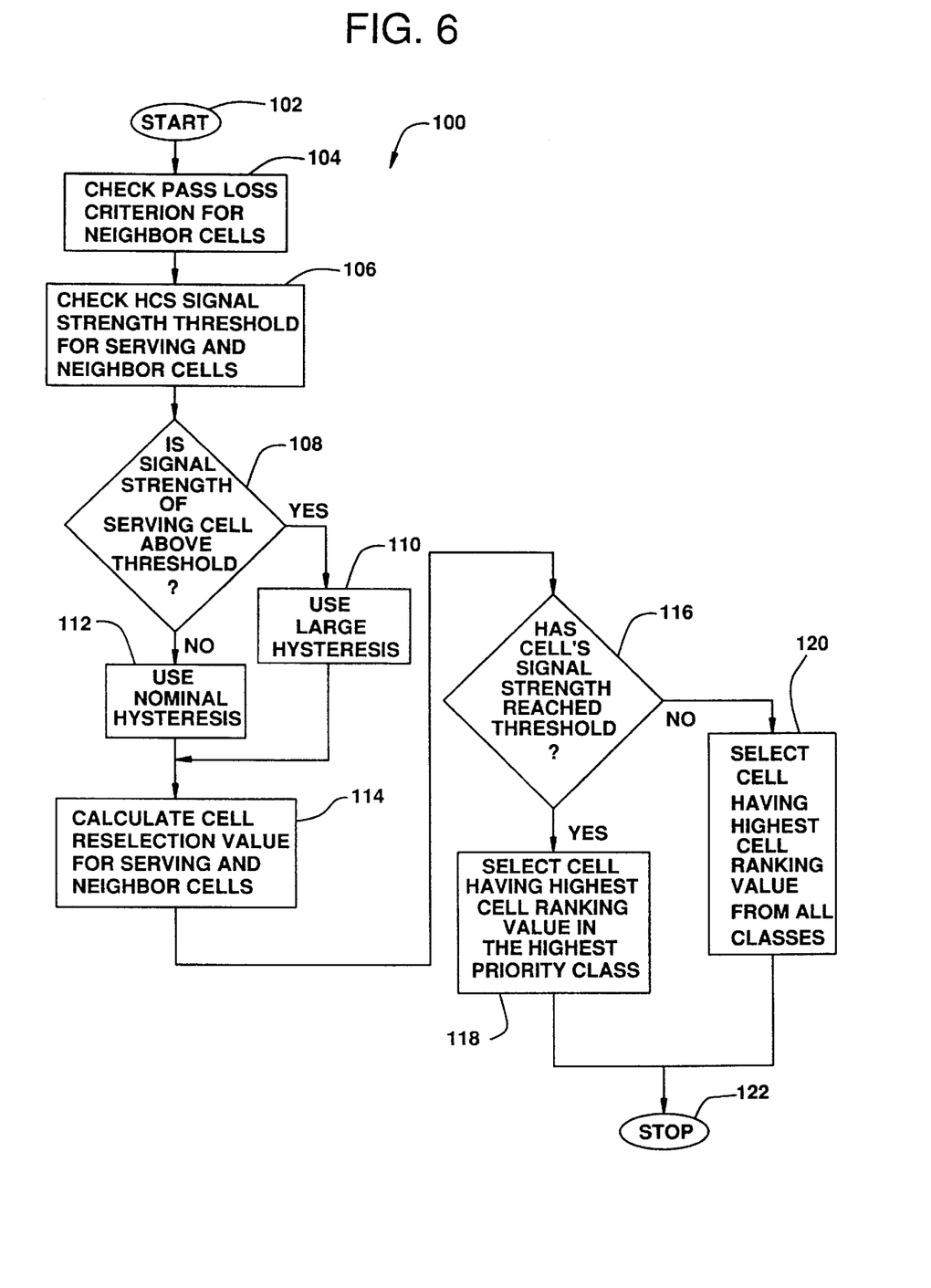
FIG. 6 is a simplified flow diagram of a packet switched system cell reselection algorithm, which can be used in a packet switched mobile terminal to emulate a circuit switched system locating algorithm for hierarchical cell structures (HCS), in accordance with a second embodiment of the present invention.

FIG. 6 is a simplified flow diagram of a packet switched system cell reselection algorithm, which can be used in a packet switched mobile terminal (e.g., mobile terminal 64 in FIG. 5) to emulate the circuit switched system locating algorithm for hierarchical cell structures (HCS), in accordance with a second embodiment of the present invention. Although this embodiment is described with respect to the GPRS for illustrative purposes, the present invention is not intended to be so limited, and can be applied to any system employing packet switched services in a circuit switched system that is using an HCS. Generally, the present cell reselection mechanism for such an HCS overrides the "best server" approach normally used, and instead selects a cell based on a defined priority for each cell. As such, the following basic principles are followed: (1) a signal strength threshold for each cell determines which cells are qualified to take part in the hierarchical cell selection; (2) the packet switched mobile terminal involved groups the cells that it can hear, according to a priority; (3) the packet switched mobile terminal involved looks for the "best server" cell in the group with the highest priority, and continues looking in groups of successively lower priority if no such cell is found; and (4) if no cell is qualified to take part in the hierarchical cell selection, then the "best server" approach is used.

For example, the HCS approach used for the GPRS includes a cell priority mechanism and an HCS signal strength threshold check. However, the cell reselection criterion, C3, described above with respect to FIG. 2 is still used as the basis for cell reselection in the HCS environment. For the cell priority mechanism, each cell in the GPRS BA list has a tag representing its priority class. Preferably, eight priority classes are used, with class 1 being the highest priority. The packet switched mobile terminal selects a serving cell from the highest possible priority class, according to certain predefined rules. The use of such priority classes makes it possible to steer the mobile terminals to specific cells and hierarchical layers.

For the HCS signal strength threshold check, the running average of the signal strength (rxlev) from a cell is checked against its HSC threshold (HCS_THR), in order to determine if the cell is qualified for the priority mechanism. The small cell penalty parameter (Temporary Offset) is applied in the HCS signal strength threshold check, in order not to select penalized cells. The HCS parameters are used to design a hysteresis effect (i.e., to prevent a mobile terminal from being subjected to "ping-pong" reselections between hierarchical layers). This effect can be accomplished by broadcasting different HCS thresholds for a certain cell, such as one threshold for the cell itself (used when the mobile leaves the cell), and other thresholds for the neighboring cells (used when the mobile enters the cell). Preferably, these HCS parameters are broadcast on the GPRS Packet Data Broadcast Control Channel (PBBCH).

Specifically, returning to the cell reselection algorithm (100) for a packet switched mobile terminal to emulate the locating algorithm for a circuit switched system using an HCS (FIG. 6), at block 104, the algorithm checks the path loss criterion for the neighbor cells, according to the packet switched system's BA list. The path loss criterion is used as the minimum signal strength criterion, and no further processing is conducted for neighbor cells that do not meet the predefined path loss criterion. At block 106, the HCS signal strength threshold is checked for the serving and neighbor cells as follows: HCS signal strength threshold(s)=rxlev(s)−HCS_THR(s)$\geq$0 (e.g., for serving cell); and HCS signal strength threshold(n)=rxlev(n)−HCS_THR(n)−TO(n)*H (PT(n)−T)$\geq$0 (e.g., for neighbor cell), where TO represents the Temporary Offset value, PT represents the Penalty Time, and T represents the timer value.

Next, the algorithm begins to check the cell rankings. At block 108, the algorithm determines whether or not the serving cell's signal strength is at or above a predefined threshold level, as follows: rxlev(s)$\geq$RXLEV_THR(s). If so, at block 110, a large hysteresis value is used in the cell ranking calculation. Otherwise, at block 112, a nominal hysteresis value is used. At block 114, the algorithm calculates the cell rankings, as follows (wherein appropriate offsets and hysteresis values are applied to the running average of the cell's signal strength): (1) cell ranking for the serving cell=rxlev(s)-Group1(s); (2) cell ranking for the neighbor cell=rxlev(n)-Group1(n)-TO(n)*H(PT(n)-T); and (3) cell ranking for the neighbor cell with large hysteresis=rxlev(n)-Group1(n)-Group2(n)-TO(n)*H(PT(n)-T).

In order to select a serving cell, at block 116, the mobile terminal's algorithm determines whether or not the candidate cells' signal strengths have reached the HCS threshold. If so, at block 118, the algorithm selects from all such cells, that cell having the highest cell ranking value in the highest priority class. Otherwise, at block 120, the cell having the highest cell ranking value among all of the priority levels is selected.

The following radio link control parameters are broadcast from the system, preferably on the PBCCH: (1) BA list for the neighbor cells (e.g., supporting the GPRS), which can also be broadcast over the circuit switched broadcast control channel, or BCCH for the GSM; (2) serving and neighbor cells' priority class; (3) Base Station Identity Code; (4) GPRS_RESELECTION_PARAMETER_1 (for the serving and neighbor cells); (5) GPRS_RESELECTION_PARAMETER_2, or hysteresis parameter for neighbor cells, which is applied if the serving cell has a relatively high signal strength; (6) RXLEV_THR(s) (signal strength threshold for the serving cell, which is used to select Group1(n) or Group1(n)+Group2(n) for the neighbor cells); (7) TEMPORARY_OFFSET(n) (temporary offset value for neighbor cells, which is used to penalize fast moving mobile stations); (8) PENALTY_TIME(n) (duration of the TEMPORARY_OFFSET(n); and (9) HCS_THR(s, n), or HCS signal strength threshold for the serving and neighbor cells. Optionally, all or any of these radio link control parameters may be broadcast, so that the broadcast resources can be efficiently used. If one or more of these parameters is not broadcast, then the following assumptions can be made by the algorithm: (1) if the Group1(n) parameter has not been broadcast, then it can be set to the value of the Group1(s) parameter (i.e., the parameter for that neighbor cell is the same as that for the serving cell); (2) if the Group2(n) parameter has not been broadcast, then it can be set to zero (i.e., that neighbor cell has only one hysteresis value); (3) if either the HCS_THR(s) or HCS_THR(n) parameter has not been broadcast, then it can be set to zero; and (4) if all of these parameters have not been broadcast, then the existing cell reselection algorithm can be used.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for minimizing radio signal interference between a first mobile communication system and a second mobile communications system, comprising the steps of:

broadcasting at least one parameter of a plurality of radio network control parameters associated with said first mobile communication system from a network entity associated with said second mobile communications system to a mobile terminal associated with said second mobile communications system; and emulating, by said mobile terminal, a first radio network control algorithm of said first mobile communications system in a second radio network control algorithm of said second mobile communication system, using said at least one parameter of said plurality of radio network control parameters.

2. The method of claim 1, wherein said first mobile communications system comprises a circuit switched mobile communications system.

3. The method of claim 2, wherein said second mobile communications system comprises a packet switched mobile communications system.

4. The method of claim 1, wherein said first radio network control algorithm comprises a locating algorithm of a circuit switched mobile communications system.

5. The method of claim 4, wherein said second radio network control algorithm comprises a cell reselection algorithm of said mobile terminal in a packet switched mobile communications system.

6. The method of claim 1, wherein said first radio network control algorithm comprises a first power control algorithm of a circuit switched mobile communications system and said second radio network control algorithm comprises a second power control algorithm of a packet switched mobile communications system.

7. A method for minimizing radio signal interference between a first mobile communications system and a second mobile communications system, comprising the steps of:

broadcasting at least one parameter of a plurality of radio network control parameters associated with said first mobile communication system from a network entity associated with said second mobile communications system to a mobile terminal associated with said second mobile communications system; and emulating, by said mobile terminal. a first power control algorithm of said first mobile communications system in a second power control algorithm of said second mobile communications system, using said at least one parameter of said plurality of radio network control parameters.

8. A method for minimizing radio signal interference between a circuit switched system and a packet switched system in a mobile communications system, comprising the steps of:

broadcasting at least one parameter of a plurality of radio link control parameters associated with said circuit switched system from a network entity associated with said packet switched system to a mobile terminal associated with said packet switched system; and emulating, by said mobile terminal, a locating algorithm of said circuit switched system in a cell reselection algorithm of said packet switched system, using said at least one parameter of said plurality of radio link control parameters.

9. The method of claim 8, wherein said circuit switched system comprises the GSM.

10. The method of claim 8, wherein said packet switched system comprises the GPRS.

11. The method of claim 8, wherein the emulating step further comprises the steps of:

determining a path loss criterion for at least one cell of a plurality of neighbor cells;

determining if a signal strength level for a serving cell is less than a predefined threshold level;

calculating a selection criterion for said serving cell and said at least one cell of said plurality of neighbor cells based on said path loss criterion, said calculating including one hysteresis level if said signal strength level for said serving cell is lower than said predefined threshold level, and a second hysteresis level if said signal strength level for said serving cell is equal to or higher than said predefined threshold level; and selecting a cell with a highest value of a calculated selection criterion.

12. The method of claim 8, wherein said circuit switched system utilizes a hierarchical cell structure.

13. A method for minimizing radio signal interference between a circuit switched mobile communications system and a packet switched mobile communications system, wherein said circuit switched mobile communications system utilizes a hierarchical cell structure, comprising the steps of:

broadcasting a base station identity code, a hierarchical priority level for each of a plurality of said plurality of neighbor cells, and a signal strength level for said each of said plurality of neighbor cells, said base station identity code, said hierarchical priority level and said signal strength level being associated with said circuit switched mobile communications system, from a network entity associated with said packet switched mobile communications system to a mobile terminal associated with said packet switched mobile communications system; and emulating, by said mobile terminal, a locating algorithm of said circuit switched mobile communications system in a cell reselection algorithm of said packet switched mobile communications system, using said broadcast base station id entity code, said hierarchical priority level for each of said plurality of neighbor cells, and said signal strength level for said each of said plurality of neighbor cells.

14. A system for use in minimizing radio signal interference between a first mobile communications system and a second mobile communications system, comprising:

broadcasting means for broadcasting at least one parameter of a plurality of radio network control parameters associated with said first mobile communications system from a network entity associated with said second mobile communications system to a mobile terminal associated with said second communications system; and emulating means within said mobile terminal for emulating a first radio network control algorithm of said first mobile communications system in a second radio network control algorithm of said second mobile communications system, using said at least one parameter of said plurality of radio network control parameters.

15. The system of claim 14, wherein said first mobile communications system comprises a circuit switched mobile communications system.

16. The system of claim 15, wherein said second mobile communications system comprises a packet switched mobile communications system.

17. The system of claim 14, wherein said first radio network control algorithm comprises a locating algorithm of a circuit switched mobile communications system.

18. The system of claim 17, wherein said second radio network control algorithm comprises a cell reselection algorithm of a mobile terminal in a packet switched mobile communications system.

19. The system of claim 14, wherein said first radio network control algorithm comprises a first power control algorithm of a circuit switched mobile communications system and said second radio network control algorithm comprises a second power control algorithm of a packet switched mobile communications system.

20. A system for use in minimizing radio signal interference between a circuit switched system and a packet switched system in a mobile communications system, comprising:

broadcasting means for broadcasting at least one parameter of a plurality of radio link network control parameters associated with said circuit switched system from a network entity associated with said packet switched system to a mobile terminal associated with said packet switched system; and emulating means within said mobile terminal for emulating a locating algorithm of said circuit switched system in a cell reselection algorithm of said packet switched system.

21. The system of claim 20, wherein said emulating means utilizes said at least one parameter of said plurality of radio link network control parameters to emulate said locating algorithm.

22. The system of claim 20, wherein said circuit switched system comprises the GSM.

23. The system of claim 20, wherein said packet switched system comprises the GPRS.

* * * * *

UNITED STATES PATENT AND TRADEMARK OFFICE
CERTIFICATE OF CORRECTION

PATENT NO. : 5,930,721
DATED : Jul. 27, 1999
INVENTOR(S) : Fried et al.

It is certified that error appears in the above-identified patent and that said Letters Patent is hereby corrected as shown below:

Column 12, line 37   Replace "terminal."
With --terminal,--

Column 13, line 35   Replace "id entity"
With --identity--

Signed and Sealed this

Seventh Day of December, 1999

*Attest:*

Q. TODD DICKINSON

*Attesting Officer*   *Acting Commissioner of Patents and Trademarks*